United States Patent
Choi et al.

(10) Patent No.: US 8,542,359 B2
(45) Date of Patent: *Sep. 24, 2013

(54) DIGITAL FILTER SPECTRUM SENSOR

(75) Inventors: Byung Il Choi, Pittsburgh, PA (US); Byounghee Lee, Wexford, PA (US)

(73) Assignee: NanoLambda, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,077

(22) Filed: Sep. 7, 2012

(65) Prior Publication Data

US 2013/0044321 A1 Feb. 21, 2013

Related U.S. Application Data

(63) Continuation of application No. 12/452,577, filed as application No. PCT/US2008/008439 on Jul. 9, 2008, now Pat. No. 8,284,401.

(60) Provisional application No. 60/929,712, filed on Jul. 10, 2007.

(51) Int. Cl.
G01N 21/25 (2006.01)

(52) U.S. Cl.
USPC ........................................................ 356/419

(58) Field of Classification Search
USPC ........................................................ 356/419
See application file for complete search history.

(56) References Cited

U.S. PATENT DOCUMENTS

| | | | |
|---|---|---|---|
| 5,822,222 A * | 10/1998 | Kaplinsky et al. | 702/134 |
| 6,281,971 B1 | 8/2001 | Allen et al. | |
| 6,490,038 B1 | 12/2002 | Jung et al. | |
| 6,617,560 B2 | 9/2003 | Forke | |
| 6,933,486 B2 | 8/2005 | Pitigoi-Aron et al. | |
| 7,206,418 B2 * | 4/2007 | Yang et al. | 381/92 |
| 2006/0273245 A1 | 12/2006 | Kim et al. | |
| 2007/0142777 A1 | 6/2007 | Klein | |

FOREIGN PATENT DOCUMENTS

| JP | 2000-193526 A | 7/2000 |
|---|---|---|
| JP | 2006-145362 A | 6/2006 |

OTHER PUBLICATIONS

Bacon et al., "Miniature spectroscopic instrumentation: applications to biology and chemistry," Review of Scientific Instruments, Jan. 2004, 75(1):1-16.

Bhalotra, Sameer R., "Adaptive Optical Microspectrometers & Spectra-Selective Sensing," Dissertation submitted to Dept. of Applied Physics, Stanford University, Apr. 30, 2004, 128 pages.

Chaganti et al., "A simple miniature optical spectrometer with a planar waveguide grating coupler in combination with a piano-convex lens," Optics Express, 2006, 14(9):4064-4072.

Chang et al., "On the estimation of target spectrum for filter array based spectrometers," Optics Express, Jan. 21, 2008, 16(2):1056-1061.

(Continued)

*Primary Examiner* — Tarifur Chowdhury
*Assistant Examiner* — Abdullahi Nur
(74) *Attorney, Agent, or Firm* — The Marbury Law Law Group PLLC (57) ABSTRACT

A spectrum sensing method includes (a) receiving an incident radiation simultaneously through a filter array composed of multiple bandpass filters, (b) digitizing spectral responses of the filter array, and (c) generating an estimate of spectral profile of the incident radiation based on digitized spectral responses of the filter array.

5 Claims, 9 Drawing Sheets

(56) References Cited

OTHER PUBLICATIONS

Correia et al., "A single-chip CMOS potical microspectrometer with light-to-frequency converter and bus interface," IEEE Journal of Solid-State Circuits, Oct. 2002, 37(10):1344-1347.
Correia et al., "High-selectivity single-chip spectrometer in silicon for operation in the visible part of the spectrum," IEEE Trans. Electron Devices, Mar. 2000, 47(3):553-559.
Correia et al., "Single-chip CMOS optical micro-interferometer," Sensors and Actuators A, 2000, 82:191-197.
Grabarnik et al., "Planar double-grating microspectrometer," Optics Express, Mar. 19, 2007, 15(6):3581-3588.
Heinz et al. "Fully constrained least-squares linear spectral mixture analysis method for material quantification in hyperspectral imagery:" IEEE Trans. on Geoscience and Remote Sensing, Mar. 2001, 39(3):529-546.
Hogan, Hank, "Low-Cost Spectrometer Incorporates Spherical Beam Volume Hologram Replacing grating offers economic benefits without sacrificing resolution," Photonics Spectra, Technology World, Apr. 2000, 2 pages.
Holm-Kennedy et al., "A novel monolithic chip-integrated color spectrometer: The distributed wavelength filter component," Proc. SPIE, 1991, 1527:322-331.
Kong et al., "Infrared micro-spectrometer based on a diffraction grating," Sensors and Actuators A, 2001, 92:88-95.
Massicotte et al., "Incorporation of a positivity constraint into a Kalman-filter-based algorithm for correction of spectrometric data," IEEE Trans. Instrum. Meas., Feb. 1995, 44(1):2-7.
Massicotte et al., "Kalman-filter-based algorithms of spectrophotometric data correction: Part I. An iterative algorithm of deconvolution," IEEE Trans. Instrum. Meas., Jun. 1997, 46(3):678-684.
Miekina et al. *1993 Incorporation of the positivity constraint into a Tikhonov-method-based algorithm of measurand reconstruction Proc. Int. IMEKO-TC1&TC7 Coll.* (London, UK, Sep. 8-10, 1993) pp. 299-04 R140 Review Article.
Minas et al. "Lab-on-a-chip for measuring uric acid in biological fluids," The 16$^{th}$ European Conference on Solid-State Transducers, Proc. Eurosensors XVI, Prague, Czech Republic, Sep. 15-18, 2002, pp. 66-69.
Moore, E.H., "On the reciprocal of the general algebraic matrix." Bulletin of the American Mathematical Society, 1920, 26: 394-395.
Morawski, Roman Z., Review Article, "Spectrophotometric applications of digital signal processing," Meas. Sci. Technol., 2006, 17:R117-R144.
Ohno, Yoshi, "CIE Fundamentals for Color Measurements," IS&T NIP16 Conference, Vancouver, Canada, Oct. 16-20, 2000, 1-6.
Penrose, Roger, "A generalized inverse for matrices", Proceedings of the Cambridge Philosophical Society, 1955, 51:406-413.
Penrose, Roger, "On best approximate solution of linear matrix equations", Proceedings of the Cambridge Philosophical Society, 1956, 52:17-19.
Qureshi, Shahid U.H., "Adaptive Equalization" Proceedings of the IEEE, Sep. 1985, 73(9):1349-1387.
Rossberg, D., "Silicon micromachined infrared sensor with tunable wavelength selectivity for application in infrared spectroscopy," Sensors and Actuators A, 1995, 46-47:413-416.
Shogenji et al., "Multispectral imaging using compact compound optics," Optics Express, Apr. 19, 2004, 12(8):1643-1655.
Slima et al., "Spline-based variational method with constraints for spectrophotometric data correction," IEEE Trans. Instrum. Meas., Dec. 1992, 41(6):786-790.
Slima et al., "Kalman-filter-based algorithms of spectrophotometric data correction: Part II. Use of splines for approximation of spectra," IEEE Trans. Instrum. Meas., Jun. 1997, 46(3):685-689.
Sprzeczak et al., "Calibration of a spectrometer using a genetic algorithm," IEEE Trans. Instrum. Meas., Apr. 2000, 49(2):449-454.
Sprzeczak et al., "Cauchy-filter-based algorithms for reconstruction of absorption spectra," IEEE Trans. Instrum. Meas., Oct. 2001, 50(5):1123-1126.
Sprzeczak et al., "Cauchy filters versus neural networks when applied for reconstruction of absorption spectra," IEEE Trans. Instrum. Meas., 51(4):815-818.
Sun et al., "Dynamic evolution of surface plasmon resonances in metallic nanoslit arrays," Applied Physics Letters, 2005, 86:023111-1 to 023111-3.
Szczecinski et al., "Original-domain Tikhonov regularisation and non-negativity constraint improve resolution of spectrometric analysis," *Proc. 13th IMEKO World Congress*, Torino, Sep. 5-9, 1994, pp. 441-446.
Szczecinski et al., "A cubic FIR-type filter for numerical correction of spectrometric data," IEEE Trans. Instrum. Meas., Aug. 1997, 46(4):922-928.
Szczecinski et al., "Numerical correction of spectrometric data using a bilinear operator of measurand reconstruction," Instrum. Sci. Technol., 1997, 25:197-205.
Szczecinski et al., "Numerical correction of spectrometric data using a rational filter," J. Chemometr., 1998, 12(6):379-395.
Szczecinski et al., "Variational algorithms for spectrogram correction based on entropy-like criteria," J. Chemometr., 1998, 12(6):397-403.
Szczecinski et al., "Numerical Correction of Spectrometirc Data Using a Bilinear Operator of Measurand Reconstruction," IEEE, 1995, 488-491.
Wallrabe et al., "Mini-Fourier Transform spectrometer for the near-infrared," Sensors and Actuators A, 2005, 123-124:459-467.
Wang et al., "Concept of a high-resolution miniature spectrometer using an integrated filter array," Optics Letters, Mar. 15, 2007, 32(6):632-634.
Wang et al., "Integrated optical filter arrays fabricated by using the combinatorial etching technique," Optics Letters, Feb. 1, 2006, 31(3):332-334.
Wisniewski et al., "An adaptive rational filter for interpretation of spectrometric data," IEEE Trans. Instrum. Meas., 1999, 1907-1912.
Wolffenbuttel, R.F., "MEMS-based optical mini- and microspectrometers for the visible and infrared spectral range," J. of Micromechanics and Microengineering 2005, 15:S145-S152.
Wolffenbuttel, R.F., "Silicon photodetectors with a selective spectral response," Sensors Update, H. Baltes, J. Hesse, and J. Korvink, Eds. Berlin, Germany: Wiley-VCH, 2001, vol. 9, pp. 69-101.
Wolffenbuttel, "State-of-the-Art in Integrated Optical Microspectrometers," IEEE Transactions on Instrumentation and Measurement, Feb. 2004, 53(1):197-202.

\* cited by examiner

DIGITAL FILTER SPECTRUM SENSOR

The present application claims benefit of U.S. provisional patent application 60/929,712, filed Jul. 10, 2007, which is incorporated herein by reference in its entirety.

BACKGROUND OF THE INVENTION

Optical spectroscopy technology has been widely used to detect and quantify the characteristics or concentration of a physical, chemical or biological target object. Optical diagnostics using this optical spectroscopy allows for the ability to obtain chemical and biological information without taking a physical specimen or the ability to obtain information in a non-destructive method with a physical specimen. The challenge is that the adoption of this technology has been limited due to the size of equipment and its cost. Therefore, its application was historically limited to centralized labs with scaled testing protocols. The opportunity now exists to develop a compact and low cost spectrometer. Among those previous efforts to miniaturize the spectrometer to expand the application of this optical spectroscopy into broader uses, the planar waveguide-based, grating-based, and Fabry-Perot-based techniques have been the major approaches. Recently there also have been efforts to miniaturize the spectrometer into chip scale using plasmonic nano-optic methods.

One of the issues encountered when trying to miniaturize the spectrometer is the resolution degradation. The resolution is usually dominated by the optics, especially by the distance from the input slit where the input light comes into the system to the detector array (or PDA, photo diode array). The shorter the distances, are the higher the resolution degradation. In case of non-dispersion methods or spectrum sensor using sets of filters, the number of the filters and shape or bandwidth (FWHM: Full Width Half Maximum) of each filter dominate the degradation. The more number of filters and the narrower FWHM provides the higher resolution.

SUMMARY OF THE INVENTION

The methods and the systems to enhance the resolution of the optical spectrometer or spectrum sensor, and its applications are disclosed. The spectral responses of the filter array of the spectrum sensor are digitized through sampling and quantization, and stored to form a matrix of filter function. The filter function matrix is used to get the estimates of the spectral profile of the input through the various estimate techniques with known input constraints and boundary conditions.

BRIEF DESCRIPTION OF THE DRAWINGS

FIGS. 5A-5D and 6A-6B are plots of intensity (arbitrary units) versus wavelength.

DETAILED DESCRIPTION OF THE PREFERRED EMBODIMENTS

Unless otherwise specified, the words "a" or "an" as used herein mean "one or more". The term "light" includes visible light as well as UV and IR radiation. The invention includes the following embodiments.

Figure 1:
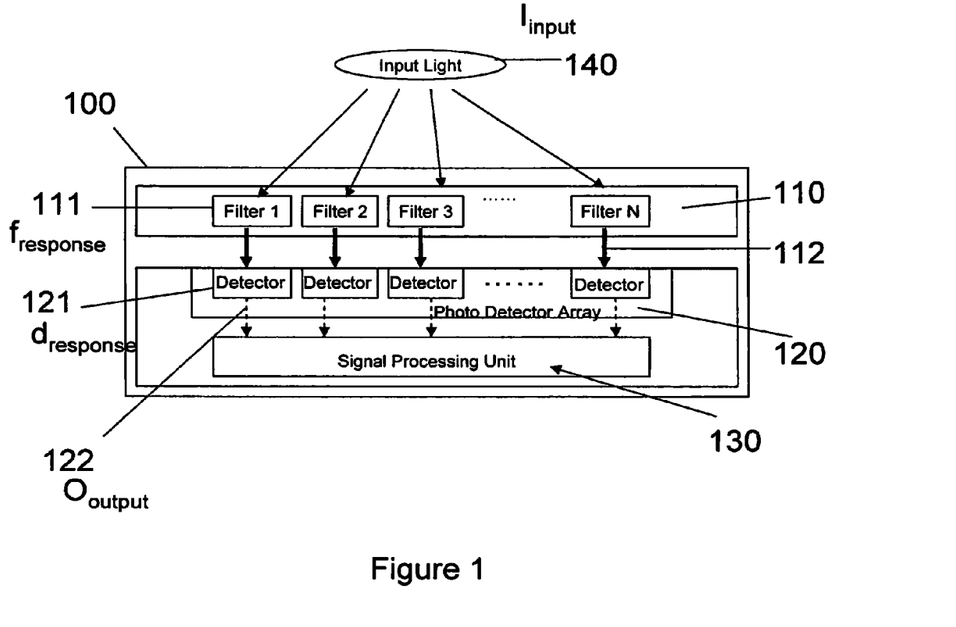
FIG. 1 is a schematic representation of spectrum sensor using digitized spectral responses of filter array.
Figure 2A:
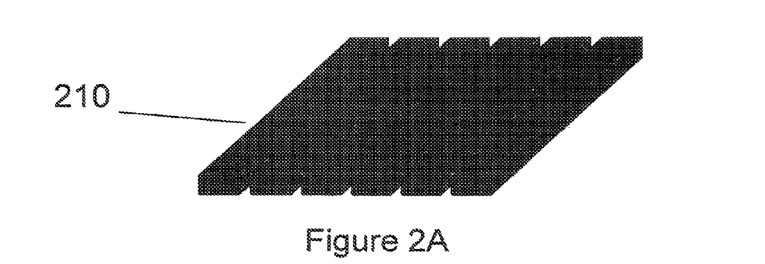
FIGS. 2A, 2B and 2C show the perspective views of different types of plasmonic nano-optic filter devices.
Figure 2B:
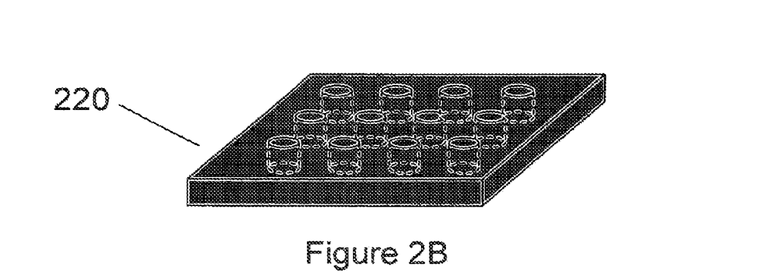
Figure 2C:
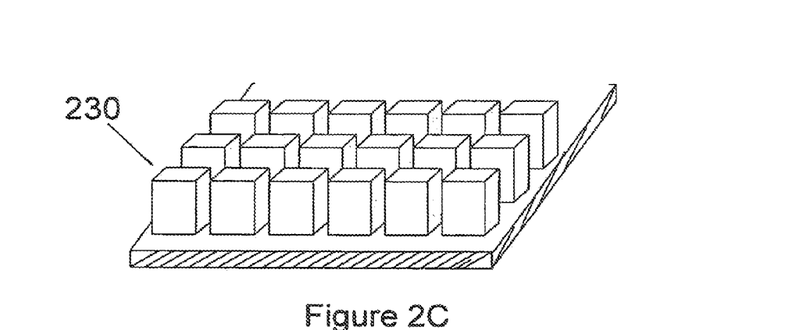

In FIG. 1, a digital filter spectrum sensor 100 is shown containing a set of filters 110, and a set or array of detectors 120 (such as a photo diode array or another suitable photodetector array), and signal processing unit 130. The filters may be made of dielectric or metallic materials, may be waveguide structures or grating structures or Fabry-Perot etalon structures or plasmonic filter structures. The examples of plasmonic filter structures are shown in FIGS. 2A, 2B, and 2C. In FIG. 2A, the plasmonic filter device 210 shows the metallic nanowire or island structure. In FIG. 2B, the plasmonic filter device 220 shows the metallic film with apertures or holes. Examples of such devices 210 and 220 are described for example in U.S. published application US 2006/0273245 A1, which is incorporated by reference in its entirety. In FIG. 2C, the plasmonic filter device 230 shows the metallic embossing structures on a metal film. Examples of such device 230 are described for example in U.S. provisional application Ser. No. 60/877,660 filed on Dec. 29, 2006, which is incorporated by reference in its entirety. The plurality of metal islands, multiple apertures in metal film or metal embossing array on a metal film are configured such that the incident light is resonant with at least one plasmon mode on the structures in said metal film or metal islands. A predetermined wavelength will perturb the metallic plasmonic structures in surface plasmon energy bands for the wavelength selective transmission of light. The filter device is located either on a dielectric substrate or in between two dielectric layers.

Figure 5A:
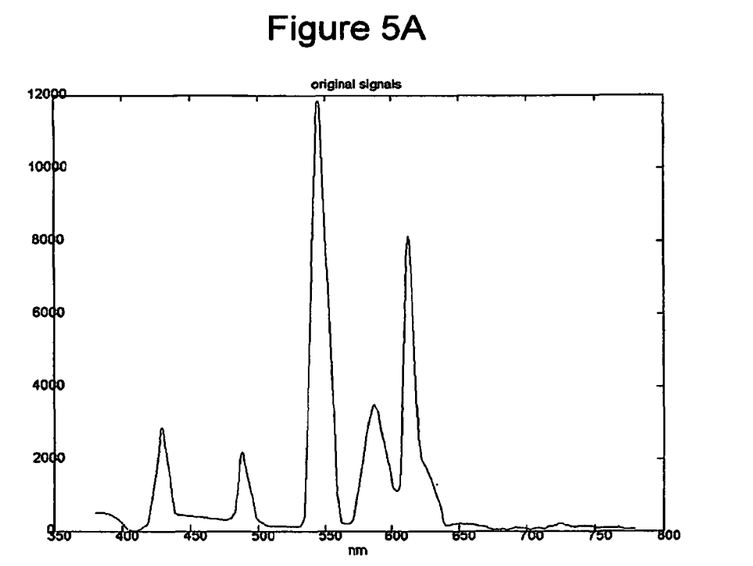
FIG. 5A is an example of spectral profile of an input light.
Figure 5B:
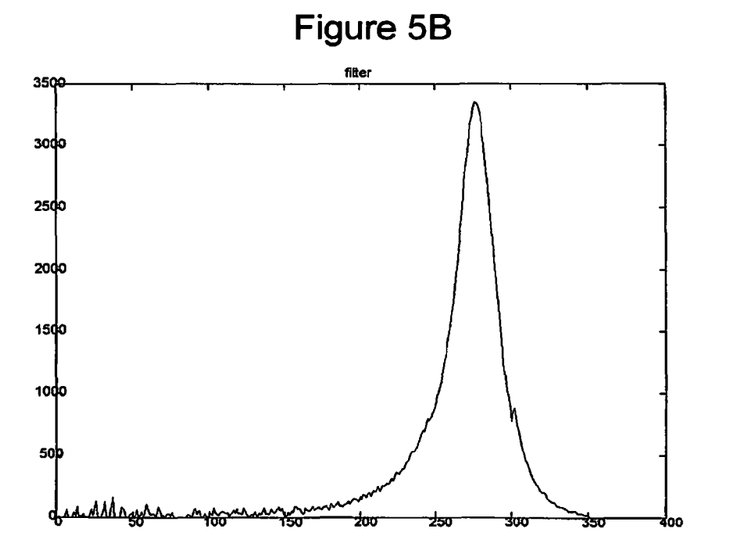
FIG. 5B is an example of a spectral response of the broad bandwidth filter.
Figure 6A:
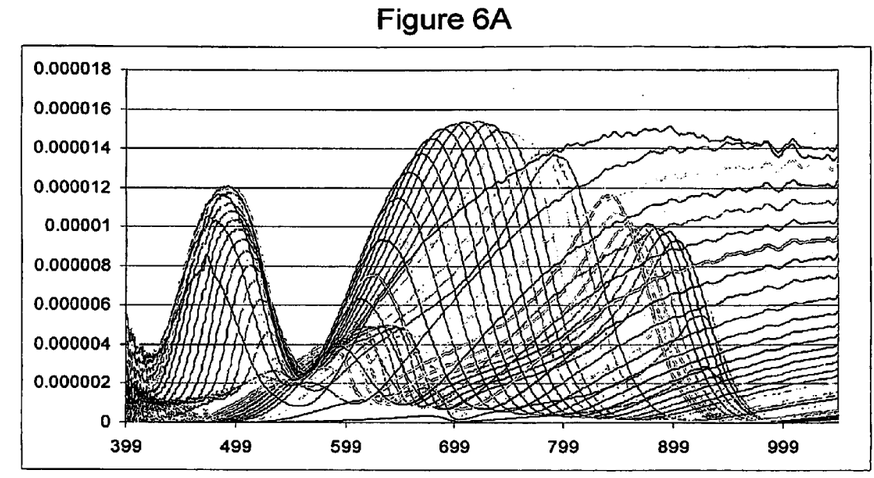
FIG. 6A shows spectral responses of 40 broad bandwidth and multipeak filter sets.
Figure 6B:
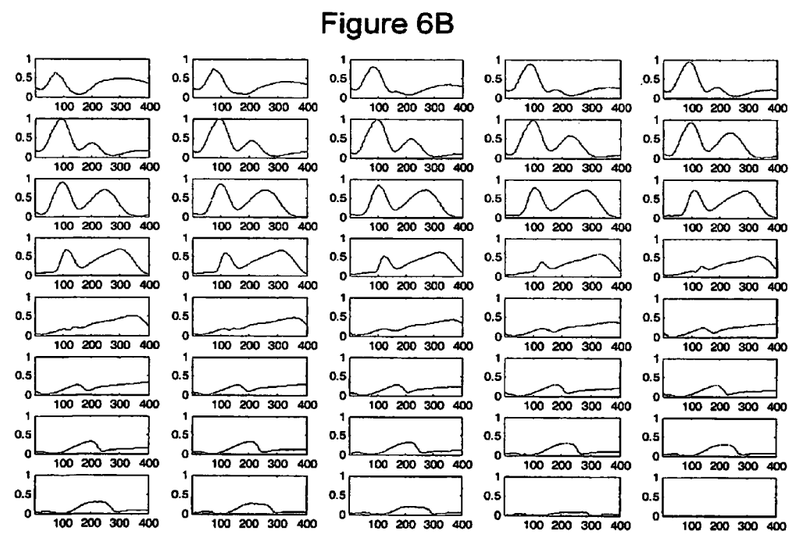
FIG. 6B shows the spectral responses of forty individual filters.

The spectral response 111 of each filter may show single peak as shown in FIG. 5B or multi-peaks as shown in FIGS. 6A and 6B. The spectral responses of individual filters can be measured at the time when the filters are fabricated or during the period when the filters are used. The measured spectral response data is digitalized through sampling in wavelength domain over the whole interest wavelength range and quantization. The sampling rate will be no less than the desired wavelength resolution. For example, if the desired resolution is 10 nm over the 400 nm range from 380 nm to 780 nm, the sampling rate will be no less than 40 times in such a way the spectral response of a filter is measured at 485 nm, 495 nm, 505 nm, . . . , and 775 nm, or more. Then the measured data is quantized to a digital data at a defined scale. For example, if the defined scale is 8-bit, the measured data is converted into 8-bit digital data. If the defined scale is 16-bit, the measured data is converted into 16-bit digital data. The digitalized filter data now will be stored in the processing unit 130, more specifically in the designated memory 331 of the processing unit.

Figure 3:
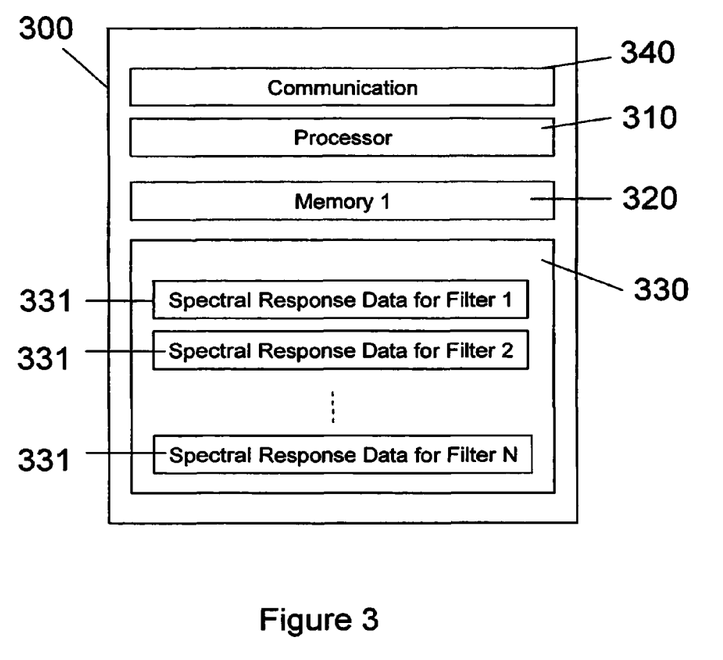
FIG. 3 is a graphical representation of processing unit within the spectrum sensor.

In FIG. 3, a processing unit 300 of the digital filter spectrum sensor 100 is shown containing a communication unit 340, a processor 310 (such as any suitable logic chip or device, such as an ASIC or a computer logic portion), a memory 320 (such as any suitable volatile or non-volatile memory device or computer portion) for program run, and a designated memory 331 for digitalized filter data. The communication unit 340 can a serial or parallel connector or can be a wireless communication unit such as a Bluetooth or Wibree, Zigbee, Wireless USB, or Wi-Fi or the variations of those. The memory 331 is preferably a non-volatile memory. In the implementation, this processing unit may reside within the same spectrum sensor device 100 or may be a separate chip or computer connected to the spectrum sensor device 100. The processing operations may be conducted by software stored in computer or by hardware of the processor 310 depending on the desired configuration and if a computer or a chip is used as a processor.

In FIG. 1, the input light $I_{input}$ 140 goes through the filter response $f_{response}$ 111 and detector response $d_{response}$ 121 to get an output matrix $O_{output}$ 122 which is N×1 array format. The detector response $d_{response}$ 121 is typically identical to all the detectors across whole detector array. When digitalized, the filter response $f_{response}$ 111 and detector response $d_{response}$ 121 are multiplied to combine the spectral responses into a single spectral response matrix F such that $F_1=(d_1 \times f_{11}, d_2 \times f_{12} \ldots d_N \times f_{1N})$, $F_2=(d_1 \times f_{21}, d_2 \times f_{22} \ldots d_N \times f_{2N})$, ..., and $F_N=(d_1 \times f_{N1}, d_2 \times f_{N2} \ldots d_N \times f_{NN})$. The $O_{output}$ now can be expressed as $F \times I_{input} + n = O_{output}$, where n is noise. When the noise n is negligible, the unknown input $I_{input}$ can be calculated or estimated through the matrix inversion operation such as $$I_{input\_estimate} = F^{-1} \times O_{output}$$

or $$I_{input\_estimate} = F^+ \times O_{output}$$

where $F^+$ is psudoinverse of F.

Figure 4:
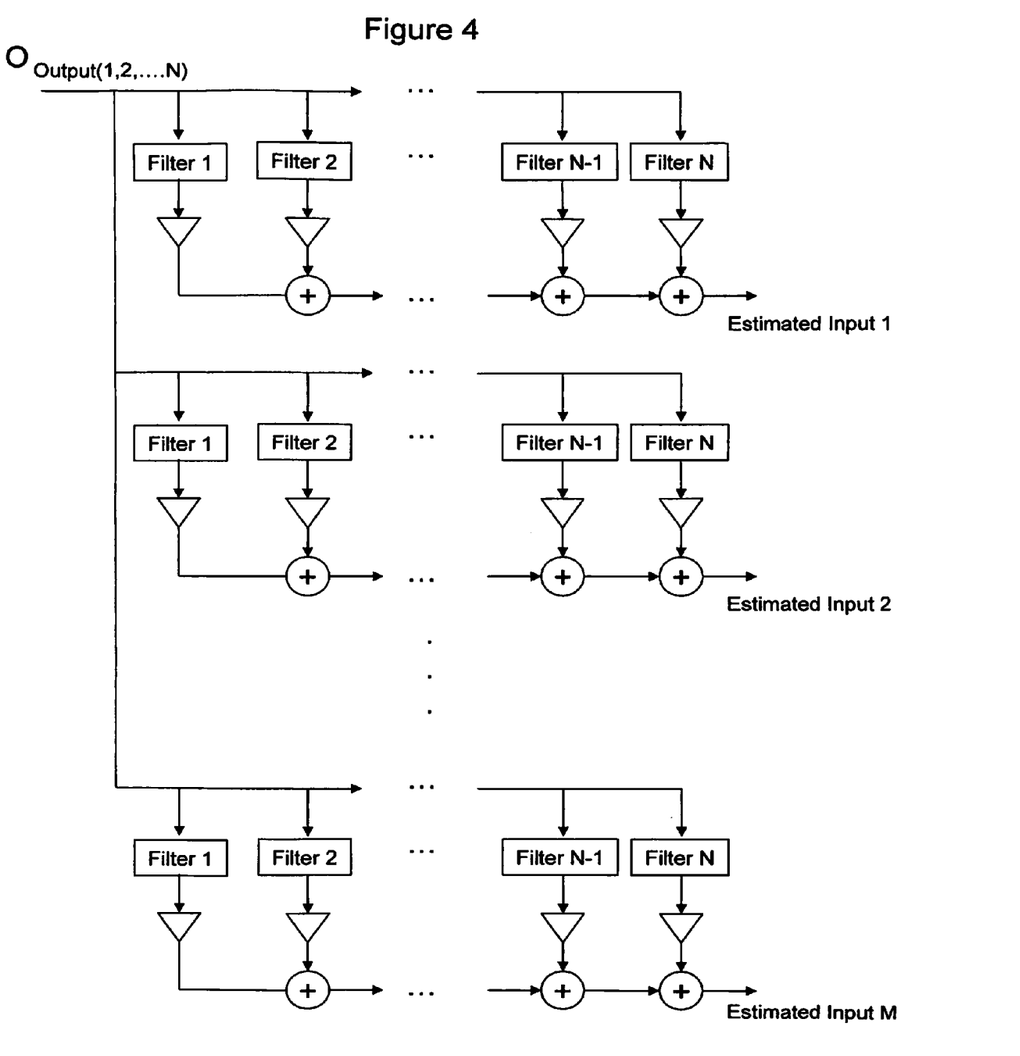
FIG. 4 shows the conceptual diagram for the operation of the Least Square estimate, equalization, or matrices inversion, or Moore-Penrose pseudoinverse.

Since the pseudoinverse provides a least squares solution to a system of linear equations, preferably, pseudoinverse operation may be used for most estimates. In FIG. 4 shows how the set of digital filter information is used to get an estimate or to calculate the input level at each wavelength point. Preferably, M (number of estimate point for an input)=N (number of filters used) where either matrx inverse or psudoinverse may be used.

In mathematics, the pseudoinverse $A^+$ of a matrix A is the unique matrix satisfying the following criteria:

1. $AA^+A=A$;
2. $A^+AA^+=A^+$ ($A^+$ is a weak inverse for the multiplicative semigroup);
3. $(AA^+)^*=AA^+$ ($AA^+$ is Hermitian); and
4. $(A^+A)^*=A^+A$ ($A^+A$ is also Hermitian).

Here M* is the conjugate transpose of a matrix M. For matrices whose elements are real numbers instead of complex numbers, $M^*=M^T$.

An alternative way to define the pseudoinverse is via a limiting process:

$$A^+ = \lim_{\delta \to 0}(A^*A + \delta I)^{-1}A^* = \lim_{\delta \to 0}A^*(AA^* + \delta I)^{-1}$$

These limits exist even if $(AA^*)^{-1}$ and $(A^*A)^{-1}$ do not exist.

a. Properties

Pseudoinversion is reversible. It is its own inverse: $(A^+)^+=A$.

The pseudoinverse of a zero matrix is its transpose.

Pseudoinversion commutes with transposition, conjugation, and taking the conjugate transpose:

$$(A^T)^+=(A^+)^T,$$

$$\overline{A^+}=\overline{A}^+,$$

and $$(A^*)^+=(A^+)^*.$$

The pseudoinverse of a scalar multiple of A is the reciprocal multiple of $A^+$:

$$(\alpha A)^+=\alpha^{-1}A^+ \text{ for } \alpha \neq 0.$$

If the pseudoinverse of A*A is already known, it may be used to compute $A^+$:

$$A^+=(A^*A)^+A^*.$$

Likewise, if $(AA^*)^+$ is already known:

$$A^+=A^*(AA^*)^+.$$

b. Special Cases

If the columns of A are linearly independent, then A*A is invertible. In this case, an explicit formula is:

$$A^+=(A^*A)^{-1}A^*.$$

It follows that $A^+$ is a left inverse of A: $A^+A=I$.

If the rows of A are linearly independent, then AA* is invertible. In this case, an explicit formula is:

$$A^+=A^*(AA^*)^{-1}.$$

It follows that $A^+$ is a right inverse of A: $AA^+=I$.

If both columns and rows are linearly independent (that is, for square nonsingular matrices), the pseudoinverse is just the inverse:

$$A^+=A^{-1}.$$

If A and B are such that the product AB is defined and either A or B is unitary, then $(AB)^+=B^+A^+$. If A and B are such that the product AB is defined, A is of full column rank, and B is of full row rank, then $(AB)^+=B^+A^+$. The second case here does not cover the first; a unitary matrix must be of full rank, but otherwise there is no assumption made on the matrix it multiplies.

It is also possible to define a pseudoinverse for scalars and vectors. This amounts to treating these as matrices. The pseudoinverse of a scalar x is zero if x is zero and the reciprocal of x otherwise:

$$x^+ = \begin{cases} 0, & \text{if } x = 0; \\ x^{-1}, & \text{otherwise.} \end{cases}$$

The pseudoinverse of the null vector is the transposed null vector. The pseudoinverse of other vectors is the conjugate transposed vector divided by its squared magnitude:

$$x^+ = \begin{cases} 0^T, & \text{if } x = 0; \\ \dfrac{x^*}{x*x}, & \text{otherwise.} \end{cases}$$

For a proof, simply check that these definitions meet the defining criteria for the pseudoinverse.

c. Finding the Pseudoinverse of a Matrix

Let k be the rank of a m×n matrix A. Then A can be decomposed as A=BC, where B is a m×k-matrix and C is a k×n matrix. Then $$A^+ = C^*(CC^*)^{-1}(B^*B)^{-1}B^*.$$

If A has full row rank, so that k=m, then B can be chosen to be the identity matrix and the formula reduces to $A^+ = A^*(AA^*)^{-1}$. Similarly, if A has full column rank (that is, k=n), then $A^+ = (A^*A)^{-1}A^*$.

A computationally simpler way to get the pseudoinverse is using the singular value decomposition.

If $A = U\Sigma V^*$ is the singular value decomposition of A, then $A^+ = V\Sigma^+ U^*$. For a diagonal matrix such as $\Sigma$, we get the pseudoinverse by taking the reciprocal of each non-zero element on the diagonal.

Optimized approaches exist for calculating the pseudoinverse of block structured matrices.

If a pseudoinverse is already known for a given matrix, and the pseudoinverse is desired for a related matrix, the pseudoinverse for the related matrix can be computed using specialized algorithms that may need less work. In particular, if the related matrix differs from the original one by only a changed, added or deleted row or column, incremental algorithms exist that exploit the relationship.

d. Applications

The pseudoinverse provides a least squares solution to a system of linear equations.

Given an overdetermined system with independent columns $$Ax=b,$$

we look for a vector x that minimizes $$\|Ax-b\|^2,$$

where ∥*∥ denotes the Euclidean norm.

The general solution to an inhomogeneous system Ax=b is the sum of a particular solution of the inhomogeneous system and the general solution of the corresponding homogeneous system Ax=0.

Lemma: If $(AA^*)^{-1}$ exists, then the solution x can always be written as the sum of the pseudoinverse solution of the inhomogeneous system and a solution of the homogeneous system:

$$x = A^*(AA^*)^{-1}b + (1 - A^*(AA)^{-1}A)y.$$

Proof:

$$\begin{aligned} Ax &= AA^*(AA^*)^{-1}b + Ay - AA^*(AA^*)^{-1}Ay \\ &= b + Ay - Ay \\ &= b. \end{aligned}$$

Here, the vector y is arbitrary (apart from the dimensionality). In both summands, the pseudoinverse $A^*(AA^*)^{-1}$ appears. If we write it as $A^+$, the equation looks like this:

$$x = A^+ b + (1 - A^+ A)y.$$

The first summand is the pseudoinverse solution. In the sense of the least squares error, it is the best linear approximation to the actual solution. This means that the correction summand has minimal euclidean norm. The second summand represents a solution of the homogeneous system Ax=0, because $(1-A^+A)$ is the projection on the kernel (null space) of A, while $(A^+A) = A^*(AA^*)^{-1}A$ is the projection onto the image (range) of A (the space spanned by the column vectors of A). The Moore Penrose pseudoinverse is described in more detail below.

As is usually the case in most signal processing system, however, there will be noises in this digital filter spectrum sensor system. The noise negatively impacts on estimating the input value, reducing the accuracy of the system. To remove or reduce the noise effects, simple spatial averaging or time averaging can be used. Spatial averaging uses the multiple identical sets of filters to receive the input at different physical locations on detector array. Time averaging uses multiple data reading through the same detector. The multiple outputs of the detectors can be averaged, or multiple of the input estimates through the matrices inversion can be averaged.

Further, when the noise n is not negligible as in most practical cases, the unknown input can be estimated through various Least Square estimate methods with various types of constraints, as summarized in the following references: Roman Z Morawski, REVIEW ARTICLE, Spectrophotometric applications of digital signal processing, Meas. Sci. Technol. 17 (2006) R117-R144, and Cheng-Chun Chang and Heung-No Lee, On the estimation of target spectrum for filter array based spectrometers, 21 Jan. 2008/Vol. 16, No. 2/OPTICS EXPRESS 1056, which are incorporated by reference in their entirety.

In the Chang et. al. reference the Least Square estimate operation is further explained in detail as following. The transformation between the target spectrum and the CCD-sensor outputs is associated by the matrix equation $$r = Hs + n, \quad (1)$$

where the dimensionalities of r, H, s, and n are N×1, N×M, M×1, and N×1, respectively.

Suppose r is an observed signal vector. Working on the observation vector, an estimator provides an estimation ŝ of the input spectrum by considering all possible source signal-vectors s. One criterion which can be used as the starting point is the maximum a posteriori (MAP) rule. The MAP estimator is obtained by maximizing the posterior probability, i.e., $$\hat{s}_{MAP} = \arg\max_{s} P(s|r). \quad (2)$$

From the Bayes' rule, the posterior probability can be written as P(s|r)=P(r|s)P(s)/P(r). Therefore, there is no information on the source signal such that P(s) is uniformly-distributed, the MAP estimator can be simplified to the maximum likelihood (ML) estimator. The ML estimator maximizes the likelihood function, i.e., $$\hat{s}_{ML} = \arg\max_{s} P(r|s). \quad (3)$$

For the filter-array spectrometer, the observed signal vector, r, and the source signal vector, s, can be associated by Eq. (1) as discussed. Now assume the noise vector n is multivariate Gaussian with zero mean and covariance matrix $R_n$, i.e., E[n]=0, and $E[nn^T]=R_n$, where the superscript T denotes the transpose operation The ML estimator then is obtained by maximizing the likelihood function $$P(r|s) = \frac{1}{(2\pi)^{N/2}|R_n|^{1/2}} \exp\left[-\frac{1}{2}(r-Hs)^T R_n^{-1}(r-Hs)\right]. \quad (4)$$

To solve for the estimator, it is equivalent to find the vector s which minimizes $-2r^T R_n^{-1} Hs + s^T H^T R_n^{-1} Hs$. The solution can be found by solving the partial differential equation $\partial(-2r^T R_n^{-1} Hs + s^T H^T R_n^{-1} Hs)/\partial s = 0$. Providing that the matrix $H^T R_n^{-1} H$ is nonsingular (i.e., inverse exists), the solution of this is $$\hat{s}_{ML} = (H^T R_n^{-1} H)^{-1} H^T R_n^{-1} r. \quad (5)$$

Furthermore, if there is no knowledge about the correlation of the Gaussian noise vector (or if the elements are mutually independent), it is reasonable to substitute the covariant matrix $R_n$ by an identity matrix I. Thus the ML estimator, Eq. (5), is reduced to the least-squares (LS) estimator, i.e., $$\hat{s}_{LS} = (H^T H)^{-1} H^T r. \quad (6)$$

It requires that the inverse of $H^T H$ matrix exists. Recall that the dimensionality of H is N×M. For solution to exist, M needs to be less than or equal to N such that the M×M $H^T H$ matrix is possibly full rank. That is, the number of filters used in the filter-array spectrometer needs to be greater than or equal to the number of resolved points in the wavelength-domain. For the most efficient and practical consideration, take M=N, i.e., H is a square matrix. Then the LS estimator can be reduced to $$\hat{s}_{inv} = (H^T H)^{-1} H^T r = H^{-1} r. \quad (7)$$

It is worth to mention that, for zero-mean noise, the $\hat{s}_{ML}$, $\hat{s}_{LS}$, and $\hat{s}_{inv}$ are unbiased, e.g., $E[\hat{s}_{ML}] = (H^T R_n^{-1} H)^{-1} H^T R_n^{-1} Hs = s$. Therefore, for a fixed unknown source signal vector s, one may have the received signal vector r measured multiple times over either the temporal or spatial domain. This unbiased property ensures the enhancement of estimation accuracy after averaging operation. The estimation-error covariance-matrix of the ML estimator, Eq. (5), can be calculated and expressed as $E[(\hat{s}-s)(\hat{s}-s)^T] = (H^T R_n^{-1} H)^{-1}$. We note that it is a function of the filter matrix H. Thus, it can show how good an estimator can be for a particular filter array. Although the covariance matrix of system noise $R_n$ is fixed, the variance of the estimation error can be amplified by the detector sensitivity matrix H. Of interest is the case that H is a square matrix. Conventionally, the singular value decomposition (SVD) is considered as a powerful technique to deal with the noise amplification issue. This method computes the inverse of the H matrix based on the singular value decomposition where an Eigen value less than a certain threshold can be discarded. By exploiting the non-negative nature of the spectral content, the non-negative constrained least-squares (NNLS) algorithm works particularly well to estimate the target spectral. NNLS can be seen as a member of the family of the least squares estimator. NNLS returns the vectors that minimizes the norm $\|H\hat{s}-r\|_2$ subject to $\hat{s}>0$. The original design of the algorithm was by C. L. Lawson, and R. J. Hanson. Although the NNLS algorithm solves the solution iteratively, the iteration always converges.

Figure 5C:
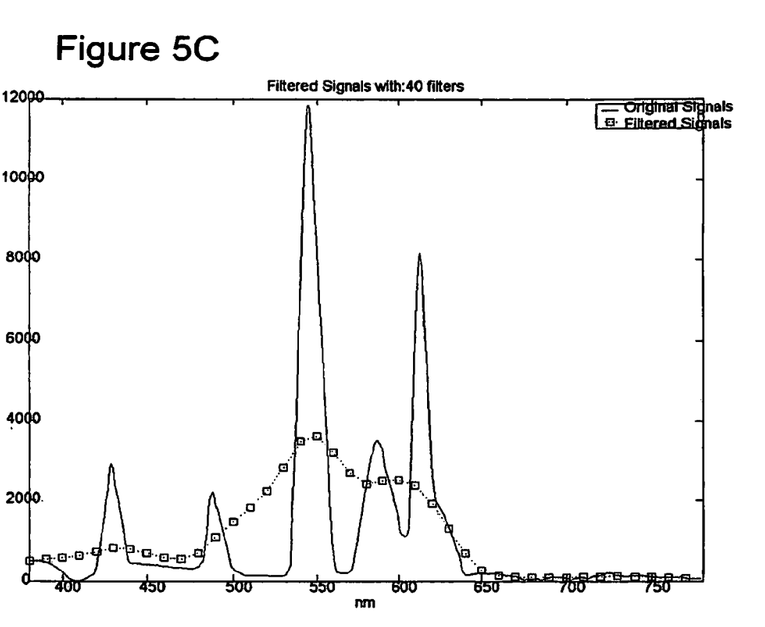
FIG. 5C shows the output result without the resolution enhancement operation.
Figure 5D:
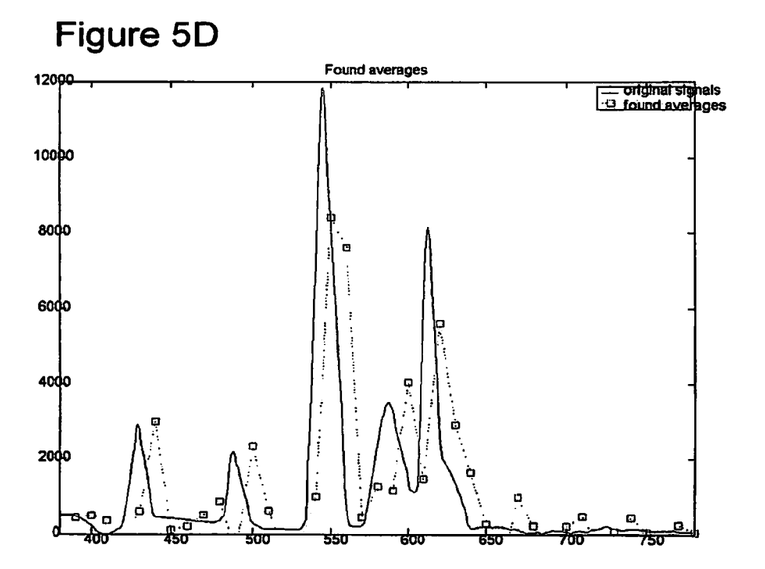
FIG. 5D shows the output result with the resolution enhancement operation.
Figure 7:
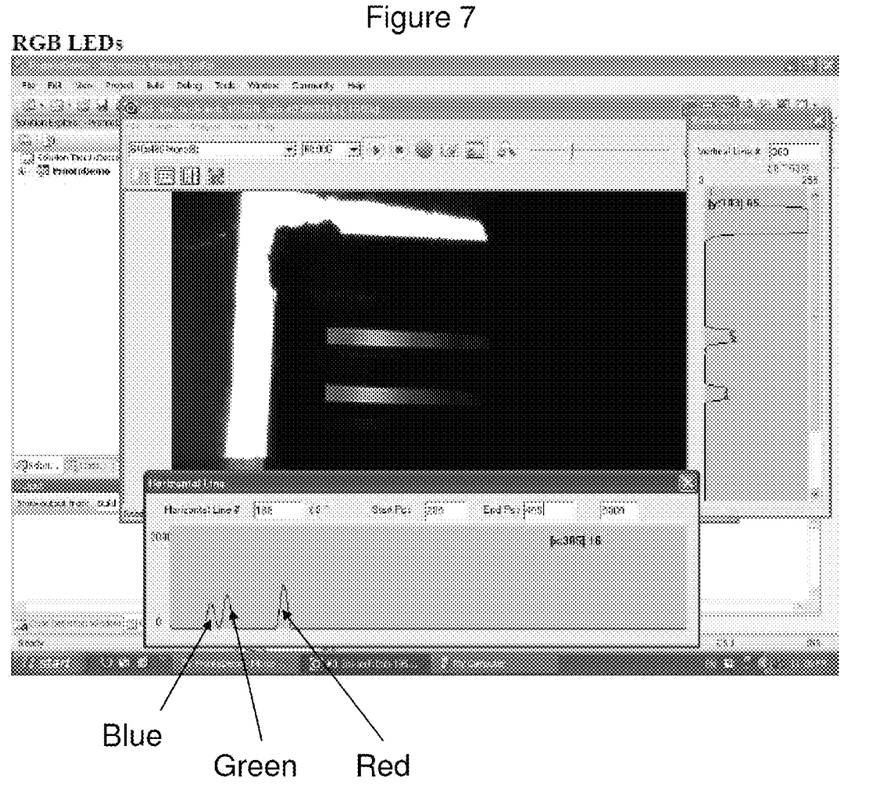
FIG. 7 shows the output results of three different LEDs (Red, Green and Blue) using the spectrum sensor through resolution enhancement operation using digitized spectral response data of filters.

The input example shown in FIG. 5A is the spectral profile of a typical fluorescence lamp. When this input is read or measured by the set 40 of the broad bandwidth filters whose FWHM(Full Width Half Maximum) is about 60 nm as shown in FIG. 5B, the output spectral profile, shown as square dot line in FIG. 5C, through these 40 filters and detectors is not very close to the original input spectral profile. However, when the matrices inversion operation is executed, the input estimates, shown as square dot line in FIG. 5D now become much more closer to the original input spectral profile. FIG. 6A and FIG. 6B show another example of filter set with the broad bandwidth and multi-peaks used to detect the spectral profile of LEDs (Red, Green and Blue). As shown in FIG. 7, the digital filter spectrum sensor with these kind of broad bandwidth and multi-peaks can rebuild the spectral profile of three LEDs, quite closely to the original LEDs' spectral profile. Noticeably, the bandwidth of the filter used is close to 100 nm, but the digital filter spectrum sensor system reconstructs the input signals at higher resolution such as 10 nm. Also the known spectral information of the LEDs, input lights, can be utilized to estimate further closer to the original signals. This color measurement capability will find lots of useful application areas in color measurement or monitoring for flat panel display, printed materials, or even in bio applications. The measured spectral information can be mapped into color domain data in different format such as CIE systems, such as CIELUV or CIELAB or CIE 1931 or CIE 1976.

Figure 8A:
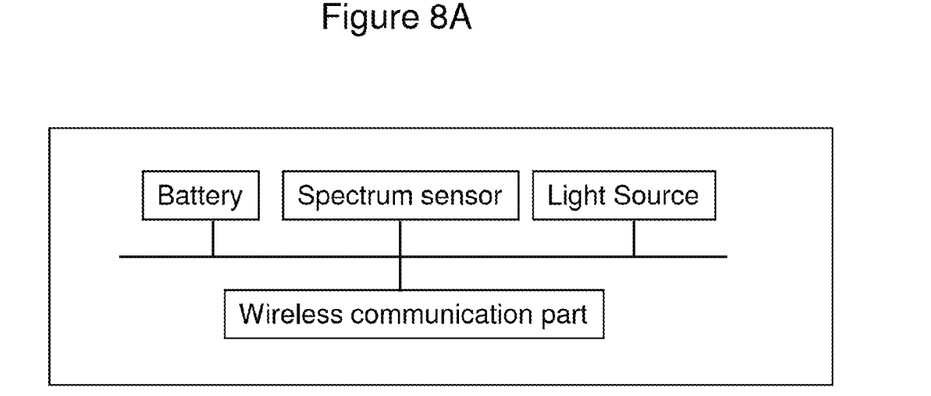
FIG. 8A shows the schematic representation of the wireless spectrum sensor.
Figure 8B:
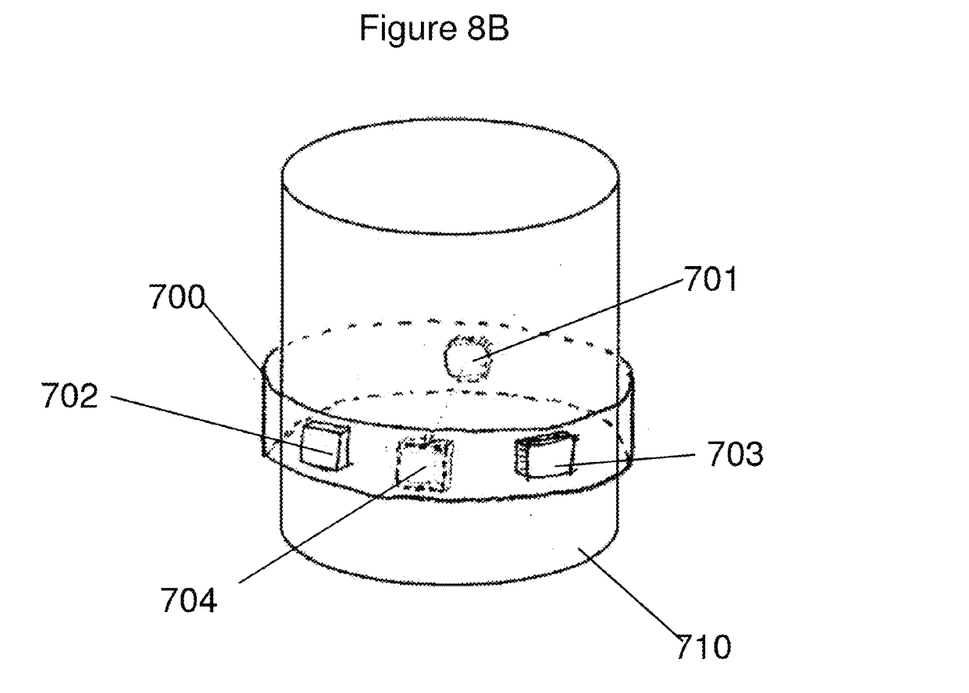
FIG. 8B shows a prospective representation of a wireless spectrum sensor around a target.

Because of its compact size and reasonable resolution, the digital spectrum sensor can be used in many applications where the small size is desired. Such applications may include mobile or wearable devices to monitor personal health, high resolution color monitoring for the color input, display and output devices, environmental monitoring sensors such as water or air quality sensors. For some of those applications, wireless solution may be more desirable. As shown in FIG. 8A and FIG. 8B, the wireless spectrum sensor has one or more embedded wireless units 702 mounted on a holder (such as a substrate or a band) along with spectrum sensor 704, one or more light sources 701, and a power unit 703, such as a battery unit or power generator. The holder may have embedded circuits connecting these embedded units. This wireless digital spectrum sensor may be located adjacent to or wrap around the target object, such as a human or animal body part or an inanimate object, or the container of the target object to be measured, or the passage or pipeline where the target objects (such as any suitable fluid) to be measured pass through. If the power unit 703 is a power generator, then this power generator may utilize wireless RF power to generate the electrical power and/or it may utilize the flow of said object, such as water or other fluid, to generate power.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention.

All of the publications, patent applications and patents cited in this specification are incorporated herein by reference in their entirety, including the following references:

Roman Z Morawski, REVIEW ARTICLE, Spectrophotometric applications of digital signal processing, Meas. Sci. Technol. 17 (2006) R117-R144;

Ben Slima M, Morawski R Z and Barwicz A 1992, Spline-based variational method with constraints for spectrophotometric data correction IEEE Trans. Instrum. Meas. 41 786-90;

Miekina A and Morawski R Z 1993 Incorporation of the positivity constraint into a Tikhonov-method-based algorithm of measurand reconstruction Proc. Int. IMEKO-TC1&TC7 Coll. (London, UK, 8-10 Sep. 1993) pp 299-04 R140 Review Article;

Szczecinski L, Morawski R Z and Barwicz A 1994 Original-domain Tikhonov regularisation and non-negativity constraint improve resolution of spectrometric analysis *Proc. 13th IMEKO World Congress (Torino, 5-9 Sep. 1994)* pp 441-6;

Massicotte D, Morawski R Z and Barwicz A 1995 Incorporation of a positivity constraint into a Kalman-filter-based algorithm for correction of spectrometric data *IEEE Trans. Instrum. Meas.* 44 2-7;

Ben Slima M, Morawski R Z and Barwicz A 1997 Kalman-filter-based algorithms of spectrophotometric data correction: Part II. Use of splines for approximation of spectra *IEEE Trans. Instrum. Meas.* 46 685-9;

Massicotte D, Morawski R Z and Barwicz A 1997 Kalman-filter-based algorithms of spectrophotometric data correction: Part I. An iterative algorithm of deconvolution *IEEE Trans. Instrum. Meas.* 46 685-9;

Szczecinski L, Morawski R Z and Barwicz A 1997 A cubic FIR-type filter for numerical correction of spectrometric data *IEEE Trans. Instrum. Meas.* 46 922-8;

Szczecinski L, Morawski R Z and Barwicz A 1997 Numerical correction of spectrometric data using a bilinear operator of measurand reconstruction *Instrum. Sci. Technol.* 25 197-205;

Szczecinski L, Morawski R Z and Barwicz A 1998 Variational algorithms for spectrogram correction based on entropy-like criteria *J. Chemometr.* 12/6 397-403;

Szczecinski L, Morawski R Z and Barwicz A 1998 Numerical correction of spectrometric data using a rational filter *J. Chemometr.* 12/6 379-95;

Wisniewski M P, Morawski R Z and Barwicz A 2003 An adaptive rational filter for interpretation of spectrometric data *IEEE Trans. Instrum. Meas.* 52 966-72;

Sprzeczak P and Morawski R Z 2000 Calibration of a spectrometer using a genetic algorithm *IEEE Trans. Instrum. Meas.* 49 449-54;

Sprzeczak P and Morawski R Z 2001 Cauchy-filter-based algorithms for reconstruction of absorption spectra *IEEE Trans. Instrum. Meas.* 50 1123-6;

Sprzeczak P and Morawski R Z 2002 Cauchy filters versus neural networks when applied for reconstruction of absorption spectra *IEEE Trans. Instrum. Meas.* 51 815-8;

Cheng-Chun Chang and Heung-No Lee, On the estimation of target spectrum for filter array based spectrometers, 21 Jan. 2008/Vol. 16, No. 2/OPTICS EXPRESS 1056;

B. Stuart, *Modern IR Spectroscopy*. New York: Wiley, 1996;

M. Born and E. Wolf, *Principles of Optics*, 5th ed. New York: Pergamon, 1975;

B. Saleh and M. C. Teich, *Fundamentals of Photonics*. New York: Wiley, 1991;

D. Rossberg, "Silicon micromachined infrared sensor with tunable wavelength selectivity for application in infrared spectroscopy," *Sens. Actuators A*, vol. 46-47, pp. 413-416, 1995;

G. Minas, J. S. Martins, C. Pereira, C. Lima, R. F. Wolffenbuttel, and J. H. Correia, "Lab-on-a-chip for measuring uric acid in biological fluids," in *Proc. Eurosensors XVI*, Prague, Czech Republic, Sep. 15-18, 2002, pp. 66-69;

R. F. Wolffenbuttel, "Silicon photodetectors with a selective spectral response," in *Sensors Update*, H. Baltes, J. Hesse, and J. Korvink, Eds. Berlin, Germany: Wiley-VCH, 2001, vol. 9, pp. 69-101;

R. F. Wolffenbuttel, "Silicon photodetectors with a selective spectral response," in *Sensors Update*, H. Baltes, J. Hesse, and J. Korvink, Eds. Berlin, Germany: Wiley-VCH, 2001, vol. 9, pp. 69-101;

J. W. Holm-Kennedy, K. W. Tsang, W. W. Sze, F. Jiang, and D. Yang, "A novel monolithic chip-integrated color spectrometer: The distributed wavelength filter component," *Proc. SPIE*, vol. 1527, pp. 322-331, 1991;

"High-selectivity single-chip spectrometer in silicon for operation in the visible part of the spectrum," *IEEE Trans. Electron Devices*, vol. 47, pp. 553-559, March 2000;

J. H. Correia, G. de Graaf, S.-H. Kong, M. Bartek, and R. F. Wolffenbuttel, "Single-chip CMOS optical micro-interferometer," *Sens. Actuators A*, vol. 82, pp. 191-197, 2000;

Reinoud F. Wolffenbuttel, "State-of-the-Art in Integrated Optical Microspectrometers," IEEE TRANSACTIONS ON INSTRUMENTATION AND MEASUREMENT, VOL. 53, NO. 1, FEBRUARY 2004;

Sameer Bhalotra, "Adaptive Optical Microspectrometers & Spectra-Selective Sensing," Dept. of Applied Physics, Stanford University, Apr. 30, 2004;

R. F. Wolffenbuttel, "MEMS-based optical mini- and microspectrometers for the visible and infrared spectral range," J. of Micromechanics and Microengineering, 15 (2005) S145-S152;

S. H. Kong, D. D. L. Wijngaards, R. F. Wolffenbuttel, "Infrared micro-spectrometer based on a diffraction grating," Sens. Act. A 92, 88-95 (2001);

Wallrabe U, Mohr J and Solf C 2004 Mini-FT spectrometer for the near-infrared *Proc Eurosensors XVIII* (Rome, Italy, 12-15 Sep. 2004) pp 160-1;

Correia J H, de Graaf G, Kong S-H, Bartek M and Wolffenbuttel R F 2000 Single-chip CMOS optical micro-interferometer *Sensors Actuators* A 82 191-7;

Hank Hogan, "Low-Cost Spectrometer Incorporates Spherical Beam Volume Hologram Replacing grating offers economic benefits without sacrificing resolution," Photonics Spectra, Technology World|April 2006;

G. Minas et al., Sensors and Actuators A 115 (2004) 362-367;

Reinoud F. Wolffenbuttel et al/*Optics Express*, Mar. 19, 2007, pp. 3581-3588;

Kalyani Chaganti et al/1 May 2006/Vol. 14, No. 9/OPTICS EXPRESS 4068;

Zhijun Sun, Yun Suk Jung, and Hong Koo Kim, "Dynamic evolution of surface plasmon resonances in metallic nanoslit arrays," APPLIED PHYSICS LETTERS 86, 023111 (2005);

Hong Koo Kim et al, Published PCT Patent Application, PCT/US2004/023499, (International filing date: Jul. 22, 2004, Priority date: Aug. 6, 2003) and its U.S. counterpart published application US 2006/0273245 A1;

Ben-Israel, Adi; Thomas N. E. Greville (2003) Generalized Inverses. Springer-Verlag. ISBN 0-387-00293-6;

Moore, E. H. (1920). "On the reciprocal of the general algebraic matrix." Bulletin of the American Mathematical Society 26: 394-395;

Penrose, Roger (1955). "A generalized inverse for matrices". Proceedings of the Cambridge Philosophical Society 51: 406-413;

Golub, Gene H.; Charles F. Van Loan (1996). Matrix computations, $3^{rd}$ edition, Baltimore: Johns Hopkins. ISBN 0-8018-5414-8;

Penrose, Roger (1956). "On best approximate solution of linear matrix equations". Proceedings of the Cambridge Philosophical Society 52: 17-19;

Shahid U. H. Qureshi, "Adaptive Equalization" PROCEEDINGS OF THE IEEE, VOL. 73. NO. 9, SEPTEMBER 1985;

Monson H. Hayes Statistical Digital Signal Processing and Modeling, Wiley, 1996, ISBN 0-471-59431-8;

Simon Haykin Adaptive Filter Theory, Prentice Hall, 2002, ISBN 0-13-048434-2;

C. P. Bacon, Y. Mattley, and R. Defrece, "Miniature spectroscopic instrumentation: applications to biology and chemistry," Review of Scientific Instruments 75, 1-16 (2004).

D. C. Heinz, and C.-I Chang, "Fully constrained least-squares linear spectral mixture analysis method for material quantification in hyperspectral imagery," IEEE Trans. on Geoscience and Remote Sensing 39, 529-546 (2001);

J. H. Correia, G. Graaf, M. Bartek, and R. F. Wolffenbuttel, "A single-chip CMOS potical microspectrometer with light-to-frequency converter and bus interface," IEEE Journal of Solid-State Circuits 37, 1344-1347 (2002);

K. Chaganti, I. Salakhutdinov, I. Avrutsky, G. W. Auner, "A simple miniature optical spectrometer with a planar waveguide grating coupler in combination with a plano-convex leng," Optics Express 14, 4064-4072 (2006);

R. F. Wolffenbuttel, "State-of-the-art in integrated optical microspectrometers," IEEE Trans. on Instrumentation and Measurement 53, 197-202 (2004);

R. Shogenji, Y. Kitamura, K. Yamada, S. Miyatake, and J. Tanida, "Multispectral imaging using compact compound optics," Optics Express 12, 1643-1655 (2004);

S.-W. Wang, C. Xia, X. Cheng, W. Lu, L. Wang, Y. Wu, and Z. Wang, "Integrated optical filter arrays fabricated by using the combinatorial etching technique," Optics Letters 31, 332-334 (2006);

S.-W. Wang, C. Xia, X. Cheng, W. Lu, M. Li, H. Wang, W. Zheng, and T. Zhang, "Concept of a high-resolution miniature spectrometer using an integrated filter array," Optics Letters 32, 632-634 (2007);

C. L. Lawson and R. J. Hanson, *Solving Least Squares Problems*, Prentice-Hall, 1974;

J. G. Proakis, Digital Communications, McGraw Hill, 2000;

Yoshi Ohno, CIE Fundamentals for Color Measurements, IS&T NIP 16 Conference, Vancouver, Canada, Oct. 16-20, 2000.

Moore Penrose Pseudoinverse

The Moore Penrose Pseudoinverse is the generalization of the inverse of an m×n matrix. It is commonly used to compute a 'best fit' (least squares) solution to a system of linear equations. In a solution, it is used to compute the original signals from the filtered version of the data.

One can find the Pseudoinverse, A+ of a matrix A as follows, $$A+=(A*A)^{\wedge}(-1)A*$$

Where A* is the transpose of the matrix and ^(-1) means to find the regular inverse.

If 'O' is the original signal data, and 'F' is non-square matrix representing the filter data, and 'A' is the data received from the sensors, $$O=(F+)A$$

What is claimed is:

1. A method for spectral resolution enhancement for spectrum sensor, comprising:
   (a) receiving an incident radiation at a photodetector array through a filter array composed of multiple bandpass filters;
   (b) digitizing spectral responses of the filter array; and
   (c) enhancing a spectral resolution using at least one of the following operations: Least Square estimate process, matrix inversion, equalization or pseudoinverse matrix manipulation of the digitized spectral responses of the filter array;
   wherein each filter of the filter array comprises a broadband filter; and
   wherein the spectral responses of different filters are independent with different peaks and dips, and distributed over an entire target spectrum ranges, and partially overlapped with multiple filters within the array.

2. The method for spectral resolution enhancement for spectrum sensor set forth in claim 1, wherein:
   the step of digitizing includes using sampling and quantization; and
   each filter of the filter array comprises a broadband filter optically coupled to a photodetector or group of photodetectors of said photodetector array.

3. The method for spectral resolution enhancement for spectrum sensor set forth in claim 1, further comprising:
   (d) averaging outputs from repeated identical filters.

4. The method for noise reduction for spectrum sensor set forth in claim 3, wherein:
   spatial or time averaging processes are used to improve a signal-to-noise ratio;
   the spatial averaging comprises averaging the outputs of repeating identical filters over an area, and
   the time averaging process comprises reading the output of a photodetector repeatedly by shutter operation of a photodetector, and averaging the outputs; and
   the spectral responses of different filters are independent with different peaks and dips, and distributed over the entire target spectrum ranges, and partially overlapped with multiple of filters within the array.

5. A spectrum sensor, comprising:
   a photodetector array;
   an array of optical filters; and
   a processing unit having stored thereon processor-executable instructions configured to cause the processing unit to generate an estimated spectral profile of input light using at least one of matrix inversion, Least Square estimate, equalization or pseudoinverse operations for spectral resolution enhancement;
   wherein each filter of the filter array comprises a broadband filter; and
   wherein the spectral responses of different filters are independent with different peaks and dips, and distributed over an entire target spectrum ranges, and partially overlapped with multiple filters within the array.

* * * * *